(12) United States Patent
Wang et al.

(10) Patent No.: US 12,355,625 B2
(45) Date of Patent: Jul. 8, 2025

(54) ADDRESS LIBRARY CONSTRUCTION METHOD AND APPARATUS APPLIED TO CDN, DEVICE, AND MEDIUM

(71) Applicant: Beijing Volcano Engine Technology Co., Ltd., Beijing (CN)

(72) Inventors: Qing Wang, Beijing (CN); Jian Wang, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 0 days.

(21) Appl. No.: 18/943,450

(22) Filed: Nov. 11, 2024

(65) Prior Publication Data

US 2025/0158888 A1 May 15, 2025

(30) Foreign Application Priority Data

Nov. 9, 2023 (CN) .......................... 202311489866.9

(51) Int. Cl.
*H04L 61/50* (2022.01)
*H04L 41/0893* (2022.01)
*H04L 67/02* (2022.01)
*H04L 67/60* (2022.01)

(52) U.S. Cl.
CPC .......... *H04L 41/0893* (2013.01); *H04L 67/02* (2013.01); *H04L 67/60* (2022.05)

(58) Field of Classification Search
None
See application file for complete search history.

(56) References Cited

U.S. PATENT DOCUMENTS

2022/0263759 A1   8/2022   Yan et al.

FOREIGN PATENT DOCUMENTS

| CN | 106161649 A |   | 11/2016 |   |
|----|-------------|---|---------|---|
| CN | 108573018 A |   | 9/2018  |   |
| CN | 108573018 B |   | 8/2020  |   |
| CN | 111901319 A | * | 11/2020 |   |
| CN | 113301085 A | * | 8/2021  | ............. H04L 67/10 |

(Continued)

OTHER PUBLICATIONS

Chinese Search Report for CN Patent Application No. 202311489866.9, Issued on Nov. 8, 2024, 2 pages.

(Continued)

*Primary Examiner* — Natisha D Cox (57) ABSTRACT

The present disclosure relates to an address library construction method and apparatus applied to a CDN, a device, and a medium. The method includes: obtaining an address library generation request, wherein the address library generation request carries target field information, and the target field information is used for reconstructing line information corresponding to a communication address; in response to the address library generation request, obtaining, from communication addresses in an original address library, a target communication address matching the target field information; obtaining reconstructed line information of the target communication address by reconstructing line information corresponding to the target communication address with the target field information; and constructing a target address library based on the target communication address and the reconstructed line information.

20 Claims, 3 Drawing Sheets

(56) References Cited

FOREIGN PATENT DOCUMENTS

| | | | | |
|---|---|---|---|---|
| CN | 110401727 B | * | 4/2022 | ............. H04L 61/10 |
| CN | 114301990 A | | 4/2022 | |
| CN | 114765738 A | | 7/2022 | |
| CN | 116233127 A | | 6/2023 | |
| CN | 116414823 A | | 7/2023 | |
| CN | 117240707 A | | 12/2023 | |
| CN | 117240825 A | | 12/2023 | |
| CN | 117240825 B | | 2/2024 | |
| WO | WO-2023179505 A1 | * | 9/2023 | ......... H04L 67/1004 |

OTHER PUBLICATIONS

International Search Report and Written Opinion for International Application No. PCT/CN2024/129980, mailed Jan. 22, 2025, 16 pages.

Extended European Search Report for European Application No. 24211916.2, mailed Mar. 27, 2025, 9 pages.

* cited by examiner

ADDRESS LIBRARY CONSTRUCTION METHOD AND APPARATUS APPLIED TO CDN, DEVICE, AND MEDIUM

CROSS-REFERENCE TO RELATED APPLICATION(S)

This application claims priority to Chinese Application No. 202311489866.9 filed on Nov. 9, 2023, the disclosure of which is incorporated herein by reference in its entity.

TECHNICAL FIELD

The present disclosure relates to the field of network communication, and in particular, to an address library construction method and apparatus applied to a CDN, a device, and a medium.

BACKGROUND

A scheduling platform of a content delivery network (CDN) often uses various Internet Protocol (IP) libraries for geographical location positioning and scheduling. After a client requests a domain name system (DNS) or another CDN server, the CDN scheduling platform can obtain an IP address of the client. After the geographical location of a user is determined based on the IP library, the CDN scheduling platform can implement access of the client at the nearest place, and schedule the client to a node closest to the client and having optimal communication network quality.

SUMMARY

In a first aspect, embodiments of the present disclosure provide an address library construction method applied to a CDN, where the method includes:
    obtaining an address library generation request, wherein the address library generation request carries target field information, and the target field information is used for reconstructing line information corresponding to a communication address;
    in response to the address library generation request, obtaining, from communication addresses in an original address library, a target communication address matching the target field information;
    obtaining reconstructed line information of the target communication address by reconstructing line information corresponding to the target communication address with the target field information; and
    constructing a target address library based on the target communication address and the reconstructed line information.

In a second aspect, embodiments of the present disclosure provide an address library construction apparatus applied to a CDN, where the apparatus includes:
    an obtaining module configured to obtain an address library generation request, wherein the address library generation request carries target field information, and the target field information is used for reconstructing line information corresponding to a communication address;
    a determination module configured to, in response to the address library generation request, obtain, from communication addresses in an original address library, a target communication address matching the target field information;
    a reconstruction module configured to obtain reconstructed line information of the target communication address by reconstructing line information corresponding to the target communication address with the target field information; and
    a construction module configured to construct a target address library based on the target communication address and the reconstructed line information.

In a third aspect, embodiments of the present disclosure provides a computer device, including: a memory and a processor, wherein the memory and the processor are communicatively connected to each other, the memory has computer instructions stored therein, and the processor executes the computer instructions to perform the method according to the first aspect or any embodiment corresponding to the first aspect.

In a fourth aspect, embodiments of the present disclosure provides a computer-readable storage medium having computer instructions stored thereon, where the computer instructions are configured to cause a computer to perform the method according to the first aspect or any embodiment corresponding to the first aspect.

BRIEF DESCRIPTION OF THE DRAWINGS

In order to more clearly describe the technical solutions in the specific implementations of the present disclosure or in the prior art, the drawings required in describing the specific implementations or the prior art will be briefly described below. Apparently, the drawings described in the following are for some implementations of the present disclosure, and other drawings can be obtained by those skilled in the art from these drawings without any creative effort.

DETAILED DESCRIPTION

In order to make the objectives, technical solutions, and advantages of the embodiments of the present disclosure clearer, the technical solutions in the embodiments of the present disclosure will be described clearly and comprehensively below with reference to the drawings in the embodiments of the present disclosure. Apparently, the described embodiments are merely some rather than all embodiments of the present disclosure. All other embodiments obtained by those skilled in the art based on the embodiments of the present disclosure without any creative effort shall fall within the protection scope of the present disclosure.

At present, address libraries of most CDN vendors are mainly developed by third-party vendors. Address libraries may not remain unchanged with the continuous increase of network requirements. However, the number of fields defined in the address libraries developed by the third-party vendors is finite, field definitions cannot fully conform to actual service scenarios, and the address libraries cannot be dynamically and effectively updated, which affects the efficiency of the CDN scheduling platform in scheduling a request. For example, a CDN system of a certain application needs to define a "region", and the "region" may be understood as a region defined according to geographical location and without an actual boundary. The field "region" may be unavailable in the address library, or may not conform to an actual requirement of the CDN.

In view of this, embodiments of the present disclosure provide an address library construction method and apparatus applied to a CDN, a device, and a medium, so as to solve the problem in the prior art that an existing address library cannot be dynamically updated, which affects the scheduling efficiency of a CDN scheduling platform.

The embodiments of the present disclosure have the following beneficial effects:

In the method provided in the embodiments of the present disclosure, the line information of the target communication address is reconstructed by using the target field information, so that the customized construction of the address library is dynamically performed according to the network requirement of the content delivery network, and the customized address library can be applied to the actual service scenario. In addition, the reconstruction of the line information of the communication address can further improve the flexibility of scheduling by the content delivery network, and the effectiveness of relevant services of the content delivery network can be ensured.

According to embodiments of the present disclosure, an address library construction method and apparatus applied to a CDN, a device, and a medium are provided. It should be noted that the steps shown in the flowcharts may be executed in a computer system such as a group of computer-executable instructions, and although a logical order is shown in the flowcharts, the steps shown or described may be executed in an order different from that here in some cases.

Figure 1:
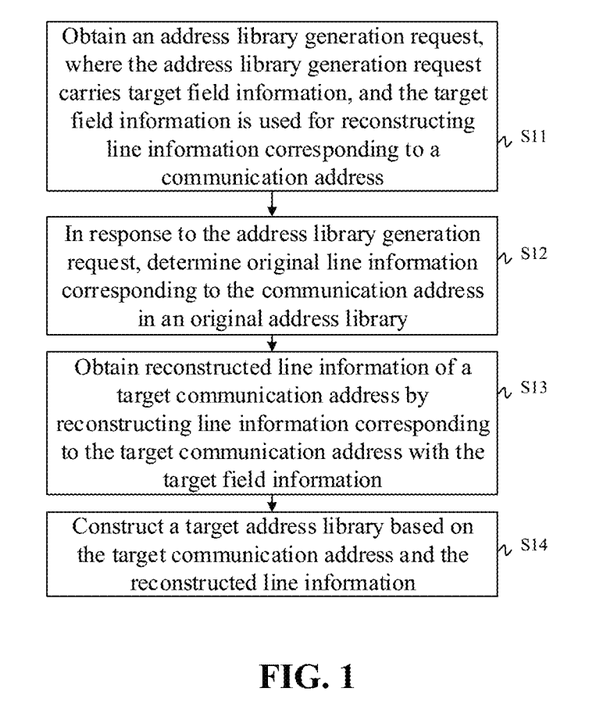
FIG. 1 is a flowchart of an address library construction method applied to a CDN according to embodiments of the present disclosure.

An address library construction method applied to a CDN is provided in these embodiments. FIG. 1 is a flowchart of an address library construction method applied to a CDN according to embodiments of the present disclosure. As shown in FIG. 1, the process includes the following steps.

Step S11: obtaining an address library generation request, where the address library generation request carries target field information, and the target field information is used for reconstructing line information corresponding to a communication address.

Figure 2:
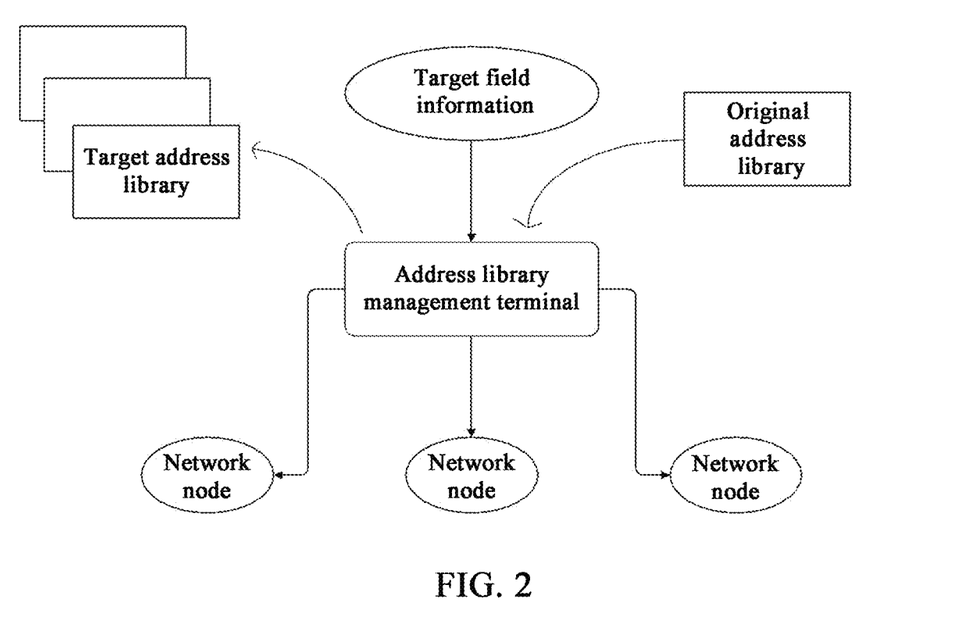
FIG. 2 is a schematic diagram of interaction of an address library management terminal according to embodiments of the present disclosure.

The method provided in the embodiments of the present disclosure is applied to an address library management terminal. The address library management terminal is deployed with an application for managing and operating an address library. The application provides functions such as importing, parsing, splitting, combining, querying, and updating an address library, so as to manage and use address information better. In the embodiments of the present disclosure, as shown in FIG. 2, the address library management terminal may obtain an original address library through a standard interface (such as API) of a third party, and then parse and process communication addresses in the original address library, and package them into different address libraries to meet different network requirements.

In the embodiments of the present disclosure, the step of obtaining the address library generation request includes the following steps A1 and A2.

Step A1: obtaining current network requirement information of the content delivery network.

In the embodiments of the present disclosure, the network requirement information of the content delivery network may be manually input by a technician. Specifically, the manually input network requirement information may be ISP combining, for example, combining ISP A and ISP B into one ISP. Alternatively, the manually input network requirement information may be region scheduling. For example, a same province has different regions divided by different ISPs. In addition, the network requirement information may be obtained by monitoring the content delivery network, for example, by detecting a traffic distribution of the content delivery network, that is, a traffic distribution at respective geographical locations, of different network ISPs, and for different terminals, and determining, according to the traffic distribution, a region that needs to be scheduled.

Step A2: constructing target field information corresponding to the network requirement information, and generating the address library generation request based on the target field information.

In the embodiments of the present disclosure, corresponding target field information is constructed according to key information in the network requirement information. The target field information includes a target field and content corresponding to the target field. It can be understood that commonly used fields include: Continent, indicating a continent where a requirement is located; Country, indicating a specific country where a requirement is located; Province, indicating a specific province or state where a requirement is located; and ISP, indicating an Internet service provider used by a requirement. The content corresponding to the target field may be a continent identification, a country identification, a region identification, an ISP identification, or the like. Finally, after the target field information is determined, the address library generation request is generated using the target field information.

The method provided in the embodiments of the present disclosure allows custom fields, that is, adding, deleting, or modifying specific field information according to a requirement and a service scenario of the content delivery network, or determining the network requirement information by monitoring a traffic distribution, and generating the target field information using the network requirement, thereby implementing customization of the address library. In addition, a basis is provided for dynamically adjusting the address library subsequently according to the network requirement information.

As an example, the network requirement information may be combining ISP S1 and ISP S2 in region K1. The key information in the above key requirement information includes: region K1, ISP S1, and ISP S2. In this case, the generated target field information includes: Province: K1, ISP: S1, and ISP: S2. Alternatively, the network requirement information is to divide region K2 into a large region T1 subordinate to ISP S3. The key information in the above key requirement information includes: region K2, ISP S3, and large region T1. In this case, the generated target field information includes: Province: K1, ISP: S2, and name: T1.

Step S12: in response to the address library generation request, determining line information corresponding to a communication address in the original address library.

In the embodiments of the present disclosure, the step of determining the line information corresponding to the communication address in the original address library includes the following steps B1 to B3.

Step B1: reading respective communication addresses stored in the original address library.

In the embodiments of the present disclosure, the respective communication addresses are stored in the original address library. The communication address may be understood as an IP address that points to a specific network region. The original address library may be set for some regions or some ISPs, where a region may be managed and provided with network services by one or more ISPs. For example, a communication address IP1 of the original address library belongs to region K1 and is attributed to ISP S1. A communication address IP2 of the original address library belongs to region K2 and is attributed to ISP S1. A communication address IP2 of the original address library belongs to region K3 and is attributed to ISP S2. A communication address IP2 of the original address library belongs to region K3 and is attributed to ISP S2.

Step B2: obtaining a plurality of original field information corresponding to the communication addresses by parsing the communication addresses.

In the embodiments of the present disclosure, the communication address is parsed by using a preset algorithm or a parser, and the line information, such as continent, country, province, and ISP, is extracted from the communication address.

As an example, a specific process of parsing the communication address may be as follows. First, a preset algorithm or a parser needs to be used to parse the communication address. The parsing algorithm may be different types of algorithms such as a rule-based algorithm, a pattern-matching-based algorithm, and a machine learning-based algorithm. The algorithm or parser identifies respective parts in the communication address, such as country, province, and city, according to a predefined rule or pattern. After the communication address is separated, information such as a continent, a country, and a province to which the address belongs may be determined according to a keyword or a pattern contained in the communication address. For example, by matching a keyword M, it can be determined that the address belongs to region M. Similarly, the parser may determine an ISP to which the address belongs according to a specific field, a keyword, or a pattern in the address. For example, by matching a keyword "MT" or "region M, ISP T", an ISP to which the address is attributed may be determined.

Step B3: determining a communication address with original field information matching the target field information as the target communication address.

In the embodiments of the present disclosure, after the original field information of the communication address is parsed, the original field information is matched with the target field information. The original field information includes an ISP field, a country field, a province field, and the like.

As an example, an ISP field in the original field information matches an ISP field in the target field information, that is, the ISP field in the original field information is isp: S2, and the ISP field in the target field information is isp: S2; and a province in the original field information matches a province in the target field information, that is, the original field information is Province: K1, and the target field information is Province: K1. Finally, a communication address of which the original field information matches the target field information is used as the target communication address.

Step S13: obtaining reconstructed line information of the target communication address by reconstructing line information corresponding to the target communication address with the target field information.

In the embodiments of the present disclosure, the step of reconstructing the line information corresponding to the target communication address by using the target field information to obtain the reconstructed line information of the target communication address includes the following steps C1 to C4.

Step C1: obtaining a field attribute corresponding to the target field information.

In the embodiments of the present disclosure, the field attribute corresponding to the target field information may be a newly added field and an original field. The newly added field may be understood as a field newly added on the basis of the original field information. The original field may be understood as the same as the original field parsed from the communication address.

Step C2: determining, based on a correspondence between preset field attributes and reconstruction strategies, a target reconstruction strategy corresponding to the field attribute.

In the embodiments of the present disclosure, different reconstruction strategies are set for different field attributes. Specifically, for the newly added field, the corresponding reconstruction strategy is to insert/associate the newly added field and content corresponding to the newly added field into the original field information in the line information. For the original field, the corresponding reconstruction strategy is to replace the original field information in the line information with content corresponding to the original field.

Step C3: constructing, based on the original field information, the line information corresponding to the target communication address.

In the embodiments of the present disclosure, after the target communication address is parsed by using a parser, the parsed pieces of original field information are spliced to obtain the line information corresponding to the target communication address. Specifically, the spliced line information is as follows:

{continent: X1; country: Y1; province: K2; isp: S3}, where "continent" is a continent field, "country" is a country field, "province" is a province/region field, and "isp" is an ISP field.

Step C4: obtaining the reconstructed line information by associating the target field information with the line information according to the target reconstruction strategy.

In the embodiments of the present disclosure, the step in which the target field information is associated with the line information according to the target reconstruction strategy to obtain the reconstructed line information includes: inserting the target field information into the original field information in the line information to obtain the reconstructed line information.

As an example, the target field information includes: ① continent: X1, ② country: Y1, ③ province: K2, K3, and K4, ④ isp: S3, and ⑤ name: T1. The network requirement information corresponding to the target field information is to divide regions K2, K3, and K4 in Y1 (country) into a large region T1 of an ISP S3. In this case, the line information before reconstruction is {continent: X1; country: Y1; province: K2; isp: S3}. Because there is no large region field in the line information, the large region (name) field needs to be inserted into the line information, and province: K3 and K4 are inserted into the line information, so as to obtain the reconstructed line information. The reconstructed line information is as follows: {continent: X1; country: Y1; province: K2, K3, and K4; isp: S3, name: T1}.

As an example, the target field information includes: ① continent: X1, ② country: Y1, ③ province: K2, ④ isp: S3, and ⑤ new isp: S4. The network requirement information corresponding to the target field information is to combine ISP S3 into ISP S4. The line information before reconstruction is {continent: X1; country: Y1; province: K2; isp: S3}. During reconstruction, the new ISP (new isp) field needs to be inserted into the line information to obtain the reconstructed line information. The reconstructed line information is as follows: {continent: X1; country: Y1; province: K2, isp: S3, new isp: S4}.

In the embodiments of the present disclosure, the step in which the target field information is associated with the line information according to the target reconstruction strategy to obtain the reconstructed line information further includes: replacing the original field information in the line information with the target field information to obtain the reconstructed line information.

As an example, the target field information includes: ① continent: X1, ② country: Y1, ③ province: K2, K3, and K4, and ④ isp: S3. The network requirement information corresponding to the target field information is to attribute regions K3 and K4 to an ISP S3. In this case, the line information before reconstruction is {continent: X1; country: Y1; province: K2; isp: S3}. Because there is no large region field in the line information, the region shown in the line information needs to be replaced with a new region, that is, K2, K3, and K4, in the target field information, so as to obtain the reconstructed line information. The reconstructed line information is as follows: {continent: X1; country: Y1; province: K2, K3, K4, isp: S3}.

Step S14: constructing a target address library based on the target communication address and the reconstructed line information.

In the embodiments of the present disclosure, after the line information of the target communication address is reconstructed, the target address library may be directly constructed based on the target communication address and the reconstructed line information, and then the target address library is packaged. The packaged target address library is usually placed in an object storage system in a specified file format (for example, mmdb). By packaging the target address library into an address format, different address library requirements and data format requirements can be flexibly adapted to. In actual applications, an appropriate file format (for example, mmdb) may be selected for storage according to actual situations. In addition, the target address library is packaged and stored in the object storage system, so that the target address library can be conveniently managed and maintained, for example, performing operations such as backup, update, and version control on the target address library.

In the method provided in the embodiments of the present disclosure, the line information of the target communication address is reconstructed by using the target field information, so that the customized construction of the address library is dynamically performed according to the network requirement of the content delivery network, and the customized address library can be applied to the actual service scenario. In addition, the reconstruction of the line information of the communication address can further improve the flexibility of scheduling by the content delivery network, and the effectiveness of relevant services of the content delivery network can be ensured.

Figure 3:
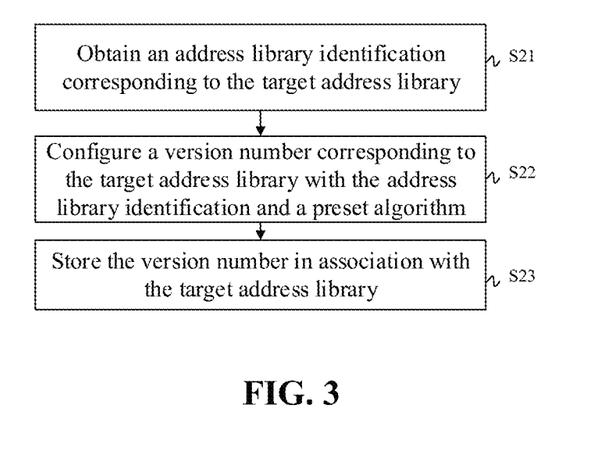
FIG. 3 is a flowchart of an address library construction method applied to a CDN according to embodiments of the present disclosure.

In the embodiments of the present disclosure, after the target address library is constructed based on the reconstructed line information and the communication address, as shown in FIG. 3, the method further includes the following steps.

Step S21: obtaining an address library identification corresponding to the target address library.

In the embodiments of the present disclosure, the address library identification corresponding to the target address library may be understood as an identification allocated after the target address library is stored in the object storage system.

Step S22: configuring a version number corresponding to the target address library with the address library identification and a preset algorithm.

In the embodiments of the present disclosure, the preset algorithm may be Message Digest Algorithm 5 (MD5). Specifically, a fixed character string may be generated by using the preset algorithm, and the version number corresponding to the target address library may be generated by using the character string and the address library identification.

Step S23: storing the version number in association with the target address library.

In the embodiments of the present disclosure, the version number is stored in association with the target address library in the object storage system. The object storage system has stored therein a plurality of historical versions of address libraries corresponding to the target address library, and version numbers corresponding to the historical versions of the address libraries are arranged in an ascending order.

It should be noted that the purpose of storing the address libraries in an ascending order of version numbers is to facilitate subsequent gray release of different versions of address libraries for different network nodes in the content delivery network. By means of the gray release of different versions of address libraries, potential risks can be controlled and reduced. If a new version of an address library is applied to all network nodes at once, a problem may have a great impact on the entire network. By means of the gray release, the performance of the new version of the address library on different network nodes can be gradually verified, and problems can be found and solved in time, so as to reduce possible risks. In addition, version management and rollback operations can be conveniently performed. For example, in a gray release process, if a problem occurs, the address library can be rolled back to a previous version at any time, so that a stable state can be quickly restored.

In addition, the gray release of different versions of address libraries may be adaptively adjusted according to characteristics and requirements of the network nodes. There may be differences in network environment, service requirements, and traffic distribution among different nodes. By releasing different versions of address libraries for different nodes, the requirements of each node can be better met, and a more optimized content delivery service can be provided.

Furthermore, with the gray release, new functions or features may be tested on some network nodes. By releasing a new version of an address library on some nodes and observing its performance and effect, the feasibility and practicability of the new function can be better evaluated and verified, and impact on the entire network is reduced.

Figure 4:
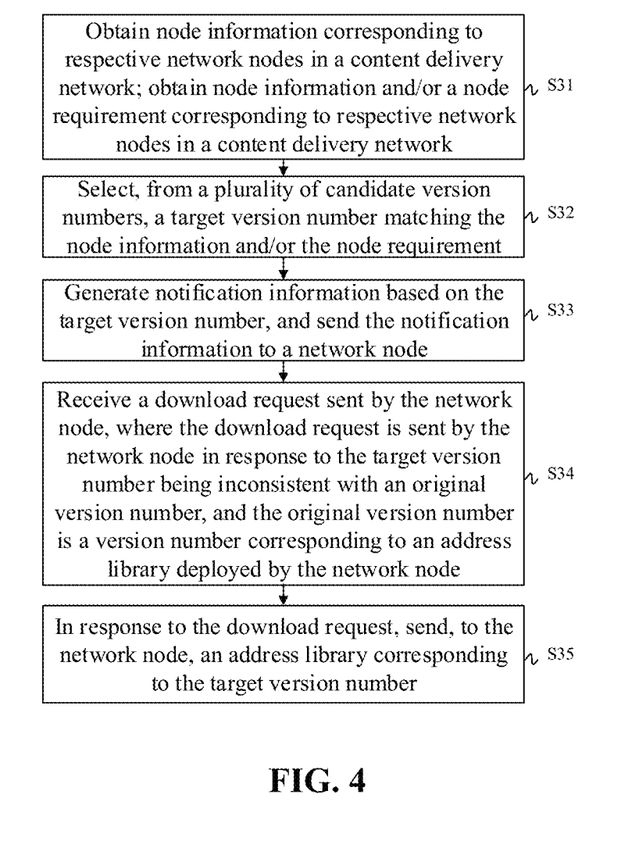
FIG. 4 is a flowchart of an address library construction method applied to a CDN according to embodiments of the present disclosure.

In the embodiments of the present disclosure, as shown in FIG. 4, the method further includes the following steps.

Step S31: node information corresponding to respective network nodes in the content delivery network is obtained; node information and/or node requirement corresponding to each network node in the content delivery network is obtained.

In the embodiments of the present disclosure, the network nodes in the content delivery network may include: a DNS scheduling node, a CDN edge node, a data analysis node, and the like. Different nodes are configured with different node information. The node information may be an IP address, a geographical location, availability, a transmission speed, and a load condition. The node requirement may be a scheduling requirement, a bandwidth requirement, a security requirement, and the like.

Step S32: an address library matching the node information and/or the node requirement is selected from a plurality of candidate address libraries.

In the embodiments of the present disclosure, the address library matching the node information and the requirement is selected from the plurality of candidate address libraries by obtaining the information and the requirement of the respective grid nodes. In this way, it can be ensured that each network node can obtain a version suitable for its own requirement, so that accurate network scheduling and data processing can be performed, and the stability of the CDN-related service can be ensured.

As an example, (1) the node information and the node requirement corresponding to the DNS scheduling node are as follows.

Node information: the IP address is 10.0.0.1, the geographical location is region T1, and the transmission speed is 1 Gbps.

Node requirement: scheduling network requests of an ISP S3 and an ISP S4 within the geographical location T1.

Based on this, a matching address library is selected from the plurality of candidate address libraries according to the geographical location T1, the ISP S3, and the ISP S4, and the target version number corresponding to the address library is obtained.

(2) The node information and the node requirement corresponding to the data analysis node are as follows.

Node information: the IP address is 172.16.0.2, the geographical location is region T2, and the transmission speed is 500 Mbps.

Node requirement: collecting network requests of an ISP S1 within the geographical location T2, and analyzing the collected network requests.

Based on this, a matching address library is selected from the plurality of candidate address libraries according to the geographical location T2 and the ISP S1, and the target version number corresponding to the address library is obtained.

Step S33: generating notification information based on a target version number corresponding to the address library, and sending the notification information to the network node.

In the embodiments of the present disclosure, after the target version number is obtained, the node address of the network node is obtained, a communication message is constructed by using the node address, the target version number is carried in the communication message as the notification information, and the communication message is sent to the corresponding network node.

Step S34: receiving a download request sent by the network node, wherein the download request is sent by the network node in response to the target version number being inconsistent with an original version number, and the original version number is a version number corresponding to an address library deployed by the network node In the embodiments of the present disclosure, after the network node receives the communication message, the communication message is parsed to obtain the version number. The network node compares the original version number of the currently deployed address library with the target version number. If the two are inconsistent, the network node sends a download request to the address library management terminal.

Step S35: in response to the download request, sending an address library corresponding to the target version number to the network node.

Figure 5:
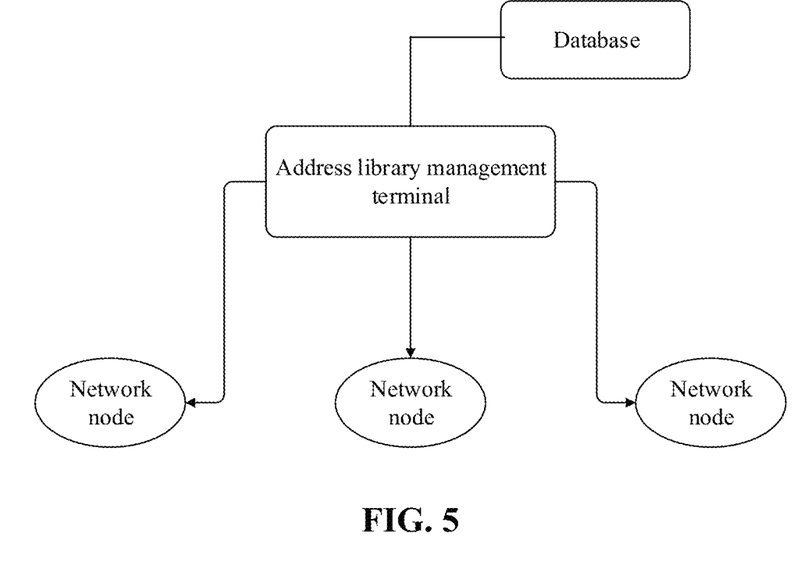
FIG. 5 is a schematic diagram of an address library delivered by an address library management terminal according to embodiments of the present disclosure.

In the embodiments of the present disclosure, as shown in FIG. 5, the address library management terminal sends the address library corresponding to the target version number to the network node in response to the download request, and then stores the target version number in association with the node identification into the database.

As an example, the address library management terminal sends a notification (which may be a protocol such as HTTP/RPC) to a network node (Node: 1.1.1.1). Node: 1.1.1.1 compares whether the local current original version number and the target version number match. If the two do not match, the address library corresponding to the target version number is downloaded through the address library management terminal according to the target version number. After the download is completed, the network node needs to compare whether the current downloaded address library and the md5 character string of the target version number match. If the two match, the downloaded address library is used to replace the local address library, and the downloaded address library is applied. If the two do not match, the network node automatically prevents the next operation, and the address library update is not applied.

According to the method provided in the embodiments of the present disclosure, an appropriate target version number is selected according to the network node information and/or the node requirement, so as to ensure that the network node obtains the address library matching its requirement. The release of different versions of address libraries according to the characteristics and requirements of the respective network nodes is implemented. It is favorable for the network nodes to provide a higher-quality content delivery service and improve the stability and network performance of the content delivery network.

An address library construction apparatus applied to a CDN is further provided in the embodiments. The apparatus is configured to implement the above embodiments and preferred implementations, which are not described herein again. As used below, the term "module" may implement a combination of software and/or hardware for a predetermined function. Although the apparatus described in the following embodiments is preferably implemented in software, the implementation of hardware, or a combination of software and hardware, is also possible and conceived.

Figure 6:
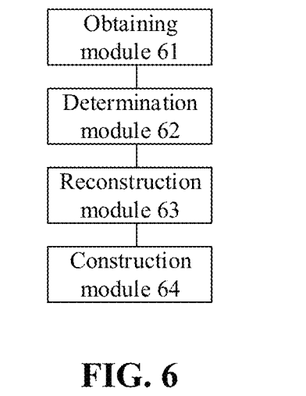
FIG. 6 is a block diagram of an address library construction apparatus applied to a CDN according to embodiments of the present disclosure.

An address library construction apparatus applied to a CDN is provided in these embodiments. As shown in FIG. 6, the apparatus includes an obtaining module 61, a determination module 62, a reconstruction module 63, and a construction module 64.

The obtaining module 61 is configured to obtain an address library generation request, where the address library generation request carries target field information, and the target field information is used for reconstructing line information corresponding to a communication address.

The determination module 62 is configured to, in response to the address library generation request, obtain, from communication addresses in an original address library, a target communication address matching the target field information.

The reconstruction module 63 is configured to obtain reconstructed line information of the target communication address by reconstructing line information corresponding to the target communication address with the target field information.

The construction module 64 is configured to construct a target address library based on the target communication address and the reconstructed line information.

In the embodiments of the present disclosure, the obtaining module 61 is configured to obtain current network requirement information of the content delivery network; and construct target field information corresponding to the network requirement information, and generate the address library generation request based on the target field information.

In the embodiments of the present disclosure, the determination module 62 includes:

A reading unit configured to read respective communication addresses stored in the original address library.

A parsing unit configured to obtain a plurality of original field information corresponding to the communication addresses by parsing the communication addresses.

A processing unit configured to determine a communication address with original field information matching the target field information as the target communication address.

In the embodiments of the present disclosure, the processing unit is configured to obtain a field attribute corresponding to the target field information; determine, based on a correspondence between preset field attributes and reconstruction strategies, a target reconstruction strategy corresponding to the field attribute; construct, based on the original field information, the line information corresponding to the target communication address; and obtain the reconstructed line information by associating the target field information with the line information according to the target reconstruction strategy.

In the embodiments of the present disclosure, the processing unit is configured to obtain the reconstructed line information by inserting the target field information into the original field information in the line information.

In the embodiments of the present disclosure, the processing unit is configured to obtain the reconstructed line information by replacing the original field information in the line information with the target field information.

In the embodiments of the present disclosure, the address library construction apparatus further includes a storage module configured to obtain an address library identification corresponding to the target address library; configure a version number corresponding to the target address library with the address library identification and a preset algorithm; and store the version number in association with the target address library.

In the embodiments of the present disclosure, the address library construction apparatus further includes a release module configured to obtain node information and/or node requirement corresponding to each network node in the content delivery network; select, from a plurality of candidate address libraries, an address library matching the node information and/or the node requirement; generate notification information based on a target version number corresponding to the address library, and sending the notification information to the network node; receive a download request sent by the network node, where the download request is sent by the network node in response to the target version number being inconsistent with an original version number, and the original version number is a version number corresponding to an address library deployed by the network node; and in response to the download request, send an address library corresponding to the target version number to the network node.

Figure 7:
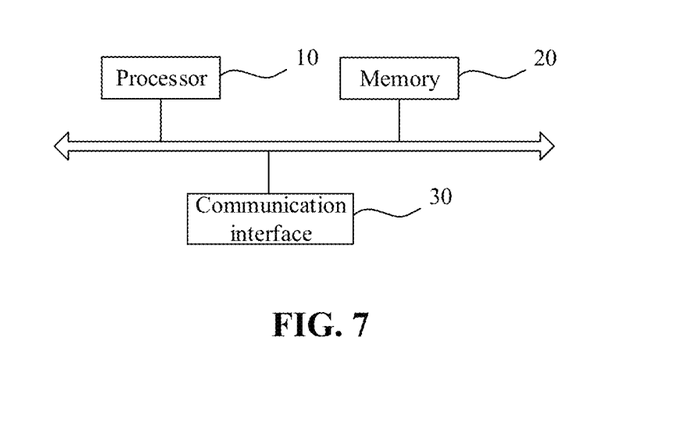
FIG. 7 is a schematic diagram of a hardware structure of a computer device according to embodiments of the present disclosure.

Referring to FIG. 7, FIG. 7 is a schematic diagram of a structure of a computer device according to optional embodiments of the present disclosure. As shown in the figure, the computer device includes: one or more processors 10, a memory 20, and interfaces for connecting components, including high-speed interfaces and low-speed interfaces. The components communicate with each other through different buses and may be installed on a common motherboard or installed in other manners as required. The processor may process instructions executed in the computer device, including storing, in the memory or on the memory, instructions for displaying graphical information of a GUI on an external input/output apparatus (such as a display device coupled to the interface). In some optional implementations, multiple processors and/or multiple buses may be used in conjunction with multiple memories and multiple memories if required. Similarly, multiple computer devices may be connected, and each device provides some necessary operations (for example, as a server array, a group of blade servers, or a multi-processor system).

The processor 10 may be a central processor, a network processor, or a combination thereof. The processor 10 may further include a hardware chip. The hardware chip may be an application-specific integrated circuit, a programmable logic device, or a combination thereof. The programmable logic device may be a complex programmable logic device, a field programmable logic gate array, a general array logic, or any combination thereof.

The memory 20 stores instructions executable by at least one processor 10, so that the at least one processor 10 performs the method shown in the above embodiments.

The memory 20 may include a program storage region and a data storage region, where the program storage region may store an operating system and applications required for at least one function; and the data storage region may store data created according to the use of the computer device in the presentation of the applet landing page. In addition, the memory 20 may include a high-speed random access memory, and may also include a non-transitory memory, such as at least one magnetic disk storage device, a flash memory device, or another non-transitory solid-state storage device. In some optional implementations, the memory 20 may optionally include a memory disposed remotely from the processor 10, and these remote memories may be connected to the computer device through a network. Examples of the above network include but are not limited to the Internet, an intranet, network, a local area network, a mobile communication network, and combinations thereof.

The memory 20 may include a volatile memory, such as a random access memory; the memory may also include a non-volatile memory, such as a flash memory, a hard disk, or a solid-state disk; and the memory 20 may further include a combination of the above types of memories.

The computer device further includes a communication interface 30 configured to communicate with other devices or communication networks.

Embodiments of the present disclosure further provide a computer-readable storage medium. The above method according to embodiments of the present disclosure may be implemented in hardware or firmware, or may be implemented as computer code that is originally stored in a remote storage medium or a non-transitory machine-readable storage medium and is downloaded through a network and is to be stored in a local storage medium, so that the method described herein may be stored in software processing on a storage medium using a general computer, a dedicated processor, or programmable or dedicated hardware. The storage medium may be a magnetic disk, an optical disk, a read-only memory, a random access memory, a flash memory, a hard disk, a solid-state disk, or the like; and further, the storage medium may further include a combination of the above types of memories. It may be understood that a computer, a processor, a microprocessor controller, or programmable hardware includes a storage component that can store or receive software or computer code, and when the software or computer code is accessed and executed by the computer, the processor, or the hardware, the method shown in the above embodiments is implemented.

Although the embodiments of the present disclosure are described with reference to the drawings, those skilled in the art may make various modifications and variations without departing from the spirit and scope of the present disclosure, and such modifications and variations all fall within the protection scope of the present disclosure.

The invention claimed is:

1. An address library construction method applied to a content delivery network (CDN), comprising:
   obtaining an address library generation request, wherein the address library generation request carries target field information, and the target field information is used for reconstructing line information corresponding to a communication address;
   in response to the address library generation request, obtaining, from communication addresses in an original address library, a target communication address matching the target field information;
   obtaining reconstructed line information of the target communication address by reconstructing line information corresponding to the target communication address with the target field information; and
   constructing a target address library based on the target communication address and the reconstructed line information.

2. The method according to claim 1, wherein obtaining the address library generation request comprises:
   obtaining current network requirement information of the content delivery network; and
   constructing target field information corresponding to the network requirement information, and generating the address library generation request based on the target field information.

3. The method according to claim 1, wherein obtaining, from the communication addresses in the original address library, the target communication address matching the target field information comprises:
   reading respective communication addresses stored in the original address library;
   obtaining a plurality of original field information corresponding to the communication addresses by parsing the communication addresses; and
   determining a communication address with original field information matching the target field information as the target communication address.

4. The method according to claim 3, wherein obtaining the reconstructed line information of the target communication address by reconstructing the line information corresponding to the target communication address with the target field information comprises:
   obtaining a field attribute corresponding to the target field information;
   determining, based on a correspondence between preset field attributes and reconstruction strategies, a target reconstruction strategy corresponding to the field attribute;
   constructing, based on the original field information, the line information corresponding to the target communication address; and
   obtaining the reconstructed line information by associating the target field information with the line information according to the target reconstruction strategy.

5. The method according to claim 4, wherein obtaining the reconstructed line information by associating the target field information with the line information according to the target reconstruction strategy comprises:
   obtaining the reconstructed line information by inserting the target field information into the original field information in the line information; or
   obtaining the reconstructed line information by replacing the original field information in the line information with the target field information.

6. The method according to claim 1, wherein after constructing the target address library based on the target communication address and the reconstructed line information, the method further comprises:
   obtaining an address library identification corresponding to the target address library;
   configuring a version number corresponding to the target address library with the address library identification and a preset algorithm; and
   storing the version number in association with the target address library.

7. The method according to claim 6, further comprising:
   obtaining node information and/or node requirement corresponding to each network node in the content delivery network;
   selecting, from a plurality of candidate address libraries, an address library matching the node information and/or the node requirement;
   generating notification information based on a target version number corresponding to the address library, and sending the notification information to the network node;
   receiving a download request sent by the network node, wherein the download request is sent by the network node in response to the target version number being inconsistent with an original version number, and the original version number is a version number corresponding to an address library deployed by the network node; and
   in response to the download request, sending an address library corresponding to the target version number to the network node.

8. A computer device, comprising:
   a memory and a processor, wherein the memory and the processor are communicatively connected to each other, the memory has computer instructions stored therein, and the computer instructions, when executed by the processor, cause the computer device to:
   obtain an address library generation request, wherein the address library generation request carries target field information, and the target field information is used for reconstructing line information corresponding to a communication address;
in response to the address library generation request, obtain, from communication addresses in an original address library, a target communication address matching the target field information;
obtain reconstructed line information of the target communication address by reconstructing line information corresponding to the target communication address with the target field information; and
construct a target address library based on the target communication address and the reconstructed line information.

9. The computer device according to claim 8, wherein the instructions causing the computer device to obtain the address library generation request further cause the computer device to:
obtain current network requirement information of the content delivery network; and
construct target field information corresponding to the network requirement information, and generate the address library generation request based on the target field information.

10. The computer device according to claim 8, wherein the instructions causing the computer device to obtain, from the communication addresses in the original address library, the target communication address matching the target field information further cause the computer device to:
read respective communication addresses stored in the original address library;
obtain a plurality of original field information corresponding to the communication addresses by parsing the communication addresses; and
determine a communication address with original field information matching the target field information as the target communication address.

11. The computer device according to claim 10, wherein the instructions causing the computer device to obtain the reconstructed line information of the target communication address by reconstructing the line information corresponding to the target communication address with the target field information further cause the computer device to:
obtain a field attribute corresponding to the target field information;
determine, based on a correspondence between preset field attributes and reconstruction strategies, a target reconstruction strategy corresponding to the field attribute;
construct, based on the original field information, the line information corresponding to the target communication address; and
obtain the reconstructed line information by associating the target field information with the line information according to the target reconstruction strategy.

12. The computer device according to claim 11, wherein the instructions causing the computer device to obtain the reconstructed line information by associating the target field information with the line information according to the target reconstruction strategy further cause the computer device to:
obtain the reconstructed line information by inserting the target field information into the original field information in the line information; or
obtain the reconstructed line information by replacing the original field information in the line information with the target field information.

13. The computer device according to claim 8, wherein the instructions further cause the computer device to, after constructing the target address library based on the target communication address and the reconstructed line information:
obtain an address library identification corresponding to the target address library;
configure a version number corresponding to the target address library with the address library identification and a preset algorithm; and
store the version number in association with the target address library.

14. The computer device according to claim 13, the instructions further cause the computer device to:
obtain node information and/or node requirement corresponding to each network node in the content delivery network;
select, from a plurality of candidate address libraries, an address library matching the node information and/or the node requirement;
generate notification information based on a target version number corresponding to the address library, and send the notification information to the network node;
receive a download request sent by the network node, wherein the download request is sent by the network node in response to the target version number being inconsistent with an original version number, and the original version number is a version number corresponding to an address library deployed by the network node; and
in response to the download request, send an address library corresponding to the target version number to the network node.

15. A non-transitory computer-readable storage medium, wherein the computer-readable storage medium has computer instructions stored thereon, and the computer instructions are configured to cause a computer to:
obtain an address library generation request, wherein the address library generation request carries target field information, and the target field information is used for reconstructing line information corresponding to a communication address;
in response to the address library generation request, obtain, from communication addresses in an original address library, a target communication address matching the target field information;
obtain reconstructed line information of the target communication address by reconstructing line information corresponding to the target communication address with the target field information; and
construct a target address library based on the target communication address and the reconstructed line information.

16. The medium according to claim 15, wherein the instructions causing the computer to obtain the address library generation request further cause the computer to:
obtain current network requirement information of the content delivery network; and
construct target field information corresponding to the network requirement information, and generate the address library generation request based on the target field information.

17. The medium according to claim 15, wherein the instructions causing the computer to obtain, from the communication addresses in the original address library, the target communication address matching the target field information further cause the computer to:
read respective communication addresses stored in the original address library;

obtain a plurality of original field information corresponding to the communication addresses by parsing the communication addresses; and determine a communication address with original field information matching the target field information as the target communication address.

18. The medium according to claim 17, wherein the instructions causing the computer to obtain the reconstructed line information of the target communication address by reconstructing the line information corresponding to the target communication address with the target field information further cause the computer to:

obtain a field attribute corresponding to the target field information;

determine, based on a correspondence between preset field attributes and reconstruction strategies, a target reconstruction strategy corresponding to the field attribute;

construct, based on the original field information, the line information corresponding to the target communication address; and obtain the reconstructed line information by associating the target field information with the line information according to the target reconstruction strategy.

19. The medium according to claim 18, wherein the instructions causing the computer to obtain the reconstructed line information by associating the target field information with the line information according to the target reconstruction strategy further cause the computer to:

obtain the reconstructed line information by inserting the target field information into the original field information in the line information; or obtain the reconstructed line information by replacing the original field information in the line information with the target field information.

20. The medium according to claim 15, wherein the instructions further cause the computer to, after constructing the target address library based on the target communication address and the reconstructed line information:

obtain an address library identification corresponding to the target address library;

configure a version number corresponding to the target address library with the address library identification and a preset algorithm; and store the version number in association with the target address library.

\* \* \* \* \*